United States Patent [19]

Edwards

[11] Patent Number: 4,887,831
[45] Date of Patent: Dec. 19, 1989

[54] CONVERTIBLE HITCH FOR MOBILE EQUIPMENT

[76] Inventor: John W. Edwards, P.O. Box 1151, Brandon, Fla. 33511

[21] Appl. No.: 243,856

[22] Filed: Sep. 13, 1988

[51] Int. Cl.$^4$ ............................................. B62D 53/06
[52] U.S. Cl. ................................. 280/416.3; 280/418; 280/476.1
[58] Field of Search ............... 280/418, 418.1, 415.1, 280/416.1, 416.3, 417.1, 476.1, 423.1

[56] References Cited

U.S. PATENT DOCUMENTS

| | | | |
|---|---|---|---|
| 1,983,433 | 12/1934 | Benbow et al. | 280/418 |
| 2,325,869 | 8/1943 | Mosling | 280/433 X |
| 2,430,742 | 11/1947 | Smith | 280/418 |
| 2,877,024 | 3/1959 | Storatz | 280/423.1 |
| 3,049,365 | 8/1962 | Kirchler | 280/418 X |
| 3,057,499 | 10/1962 | Dorkins | 280/81 A |
| 3,091,501 | 5/1963 | Satrum | 280/432 |
| 3,096,099 | 7/1963 | Bowles et al. | 280/441.1 |
| 3,185,496 | 5/1965 | Harbers | 280/441.1 |
| 3,252,714 | 5/1966 | Chieger et al. | 280/418 |
| 3,337,277 | 8/1967 | Arnold | 280/433 X |
| 3,881,619 | 5/1975 | Morris | 414/607 |
| 3,913,948 | 10/1975 | Gee et al. | 280/415.1 |
| 4,049,146 | 9/1977 | Decker | 414/607 |

Primary Examiner—John A. Pekar
Attorney, Agent, or Firm—Oliff & Berridge

[57] ABSTRACT

A convertible hitch for mobile equipment includes a first hitch plate attached to the mobile equipment and having a king pin protruding from a central portion thereof, and a second hitch plate with a central aperture mounted on a wheel and axle assembly which includes a tow bar member. A ball joint is provided between the second hitch plate and the wheel and axle assembly to provide for relative movement therebetween. The king pin protruding from the first hitch plate includes a circumferential groove which is engageable with a securing mechanism of a releasable fifth wheel, so that the mobile equipment can be transported on the highway by a conventional highway vehicle, such as a semitrailer truck. The king pin of the first hitch plate is also receivable in the central aperture of the second hitch plate, so that the first and second hitch plates can be removably fastened to one another to in turn attach the wheel and axle assembly to the mobile equipment. When the first and second hitch plates are fastened to one another, the tow bar of the wheel and axle assembly may be connected to the tow bar coupling of a conventional field vehicle for towing of the mobile equipment in the field.

18 Claims, 4 Drawing Sheets

CONVERTIBLE HITCH FOR MOBILE EQUIPMENT

BACKGROUND OF THE INVENTION

The present invention relates to a mobile equipment hitch which can be converted for engagement with either a releasable fifth wheel of a semitrailer truck or other highway vehicle or a tow bar coupling of an agricultural tractor, bulldozer or other field vehicle. The convertible hitch of the present invention permits mobile equipment to be towed by means of a conventional tow bar when in use in the field, but to be towed by means of a conventional, releasable fifth wheel when being transported down the highway between job sites.

Mobile equipment, such as used in agriculture, construction, and the like, is typically towed in the field by an agricultural tractor, bulldozer or similar self-propelled field vehicle by means of a conventional tow bar and tow bar coupling. This conventional form of towing in the field is the simplest, most efficient and most effective form of towing under conditions typically encountered in the field, wherein the quality and grade of the terrain vary significantly. An example of such mobile equipment is a mobile machine for uprooting vegetation from the ground, disclosed in U.S. Pat. No. 4,602,686 (fully incorporated herein by reference) and depicted in FIG. 1 herein. As seen in FIG. 1, the mobile equipment 1 includes a source of power 2 for operating the vegetation uprooting machinery, but does not include an engine or other source of power for propelling itself. Accordingly, the mobile equipment is provided with a tow bar member 3 which is removably attachable to a tow bar coupling on an agricultural tractor, bulldozer or the like (not shown) in a conventional manner. In the particular mobile equipment depicted in FIG. 1, and disclosed in U.S. Pat. No. 4,602,686, the tow bar member 3 has a pair of wheels 4 mounted thereon, and the tow bar member 3 is attached to a gooseneck 5 on the mobile equipment. A ball joint, knuckle joint or other flexible connection (not shown) is typically provided between tow bar member 3 and gooseneck 5 to provide universal flexibility between the field vehicle and the mobile equipment.

Although the conventional tow bar is satisfactory for towing mobile equipment in the field during use, it has been found unacceptable for towing the mobile equipment on the highway between job sites. In particular, the tow bar form of towing is unstable at highway speeds, especially in view of the ball joint which is typically provided between the tow bar and the gooseneck or other portion of the mobile equipment. Additionally, the conventional pin connection between the tow bar member and the tow bar coupling is also not considered sufficiently safe at highway speeds. Accordingly, a need has long existed for a hitch which can be simply, efficiently and effectively used for towing mobile equipment in the field, and at the same time be safely used for towing the mobile equipment down the highway between job sites.

Efforts were made by the present inventor to modify the mobile equipment to include a hitch such as found on conventional semitrailers which would be engageable with a releasable fifth wheel of a semitrailer truck or other highway vehicle. In this way, it was understood that the mobile equipment could be safely towed down the highway. However, there remained the problem of how to tow the mobile equipment in the field. The present invention attempted to resolve this problem by mounting a conventional, releasable fifth wheel on the agricultural tractor, bulldozer or other field vehicle to be utilized for towing the mobile equipment in the field. However, this approach suffered from a number of disadvantages. First, it was difficult to modify a conventional field vehicle to include a releasable fifth wheel, and it was in fact impossible with regard to certain field vehicles due to their construction. Second, each field vehicle to be utilized was required to be modified before it could be utilized to tow the mobile equipment in the field. Third, it was found that the conventional, releasable fifth wheel was not sufficiently durable to withstand use over rough terrains typically found in the field, and it was therefore necessary to replace the releasable fifth wheel after a very short period of use.

Thus, despite the present inventor's early efforts, there remained a need for a hitch which would overcome the foregoing disadvantages, while at the same time permitting simple, efficient, effective and safe towing of mobile equipment both in the field and on the highway.

SUMMARY OF THE INVENTION

Accordingly, the present invention has been developed to overcome the foregoing shortcomings of existing hitches utilized for towing mobile equipment.

It is therefore an object of the present invention to provide a hitch for mobile equipment which can be simply, efficiently and effectively utilized for towing the mobile equipment in the field, and safely utilized for towing the mobile equipment on the highway between job sites.

It is yet another object of the present invention to provide a hitch for mobile equipment which will withstand extended use over rough terrain in the field, while at the same time being readily adaptable for safe highway towing.

It is still a further object of the present invention to provide a hitch for mobile equipment which can be efficiently and economically manufactured, and which can be easily utilized in the field or on the highway.

Thus, in accordance with one aspect of the present invention the shortcomings of existing mobile equipment hitches are overcome by a convertible mobile equipment hitch comprising first hitch means for hitching the mobile equipment to a releasable fifth wheel of a highway vehicle, and second hitch means removably fastenable to the first hitch means for hitching the mobile equipment to a tow bar coupling of a field vehicle.

In accordance with another aspect of the present invention, the first hitch means is attached to the mobile equipment and comprises a first plate with a king pin protruding from a central portion thereof for engagement with the releasable fifth wheel of the highway vehicle. The king pin preferably includes a circumferential groove for engagement with a securing mechanism on the releasable fifth wheel of the highway vehicle.

In accordance with yet another aspect of the present invention, the second hitch means comprises a tow bar member removably attachable to the tow bar coupling of the field vehicle, and a second plate mounted on the tow bar member and having a central aperture for engagement with the king pin of the first plate.

In accordance with still another aspect of the present invention, the convertible hitch further comprises a ball joint between the tow bar member and the second plate to provide for relative movement therebetween.

Still further aspects of the present invention include the first plate being attached to a gooseneck of the mobile equipment, the first and second plates being flat plates, the first and second plates having correspondingly located holes for receipt of fasteners for removably fastening the first and second plates to one another, at least one pair of wheels mounted on the tow bar member, and at least one brace provided between the tow bar member and the second plate.

These and other aspects and advantages of the present invention are described in or apparent from the following detailed description of the preferred embodiments.

BRIEF DESCRIPTION OF THE DRAWINGS

The preferred embodiments are described with reference to the drawings in which.

DESCRIPTION OF THE PREFERRED EMBODIMENTS

Referring to FIG. 2-6, a convertible hitch constructed in accordance with the present invention will now be described.

Figure 1:
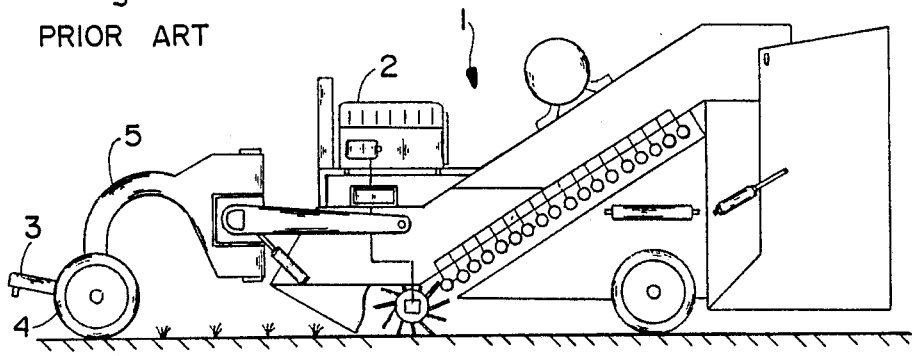
FIG. 1 is an elevation view of conventional mobile equipment for uprooting vegetation from the ground, having a conventional tow bar attached thereto for towing with a field vehicle.
Figure 2:
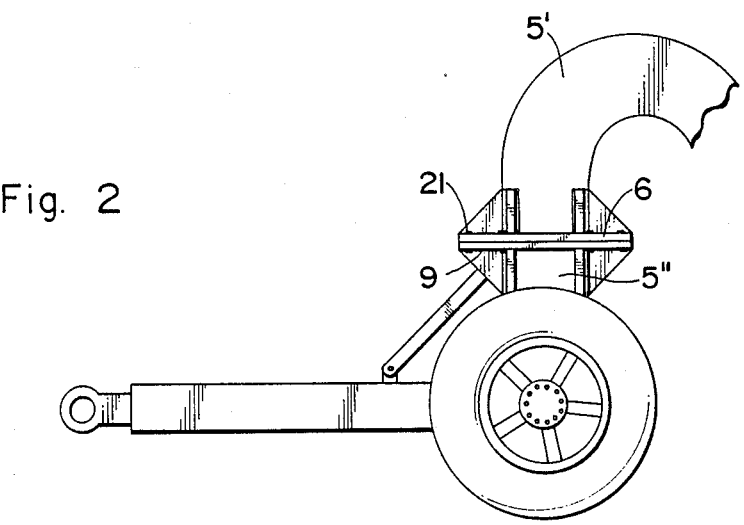
FIG. 2 is an elevation view of a pertinent portion of the mobile equipment of FIG. 1, depicting the convertible hitch of the present invention incorporated therein.
Figure 3:
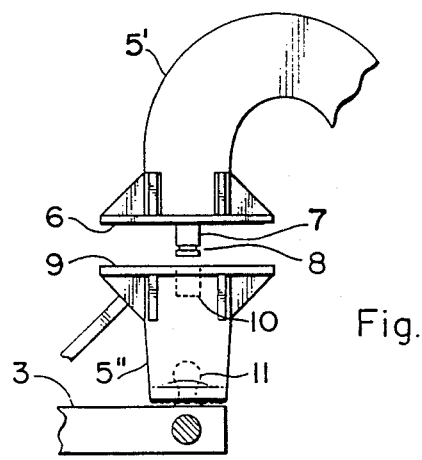
FIG. 3 is an enlarged, separated elevation view of the convertible hitch of the present invention.

As seen in FIGS. 2 and 3, the gooseneck of the mobile equipment is separated into an upper gooseneck portion 5' and a lower gooseneck portion 5". A first hitch plate 6 is fixed to upper gooseneck portion 5' by welding or other suitable means. The first plate 6 has a king pin 7 protruding from a central portion thereof, the king pin 7 preferably having a circumferential groove 8 formed therein for a purpose to be discussed below. The king pin 7 may be fixed to the first plate 6 by welding or other suitable means, or may be integrally formed with first plate 6.

A second hitch plate 9 is fixed to lower gooseneck portion 5" by welding or other suitable means. Second plate 9 has a central aperture 10 for engagement with king pin 7 of first plate 6. Second plate 9 and lower gooseneck portion 5" are mounted on a conventional tow bar member 3 of the mobile equipment. A ball joint 11, or a knuckle joint or other flexible connection, is preferably provided between lower gooseneck portion 5" and tow bar member 3 to provide for relative movement therebetween.

Figure 4:
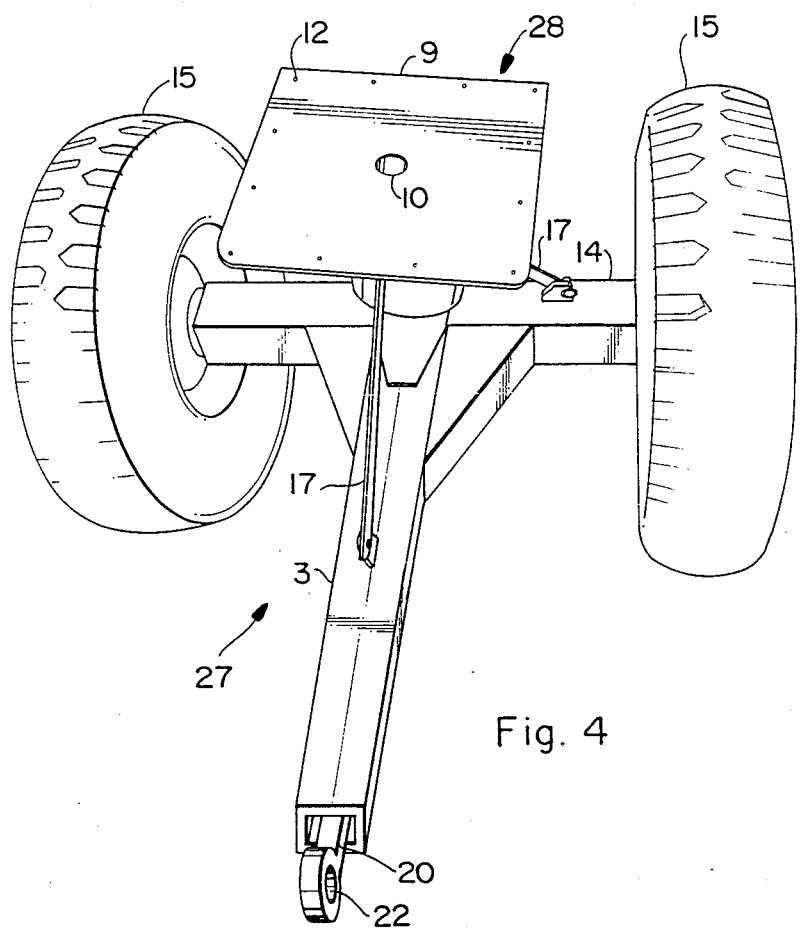
FIG. 4 is a perspective view of a lower portion of the convertible hitch of the present invention.
Figure 5:
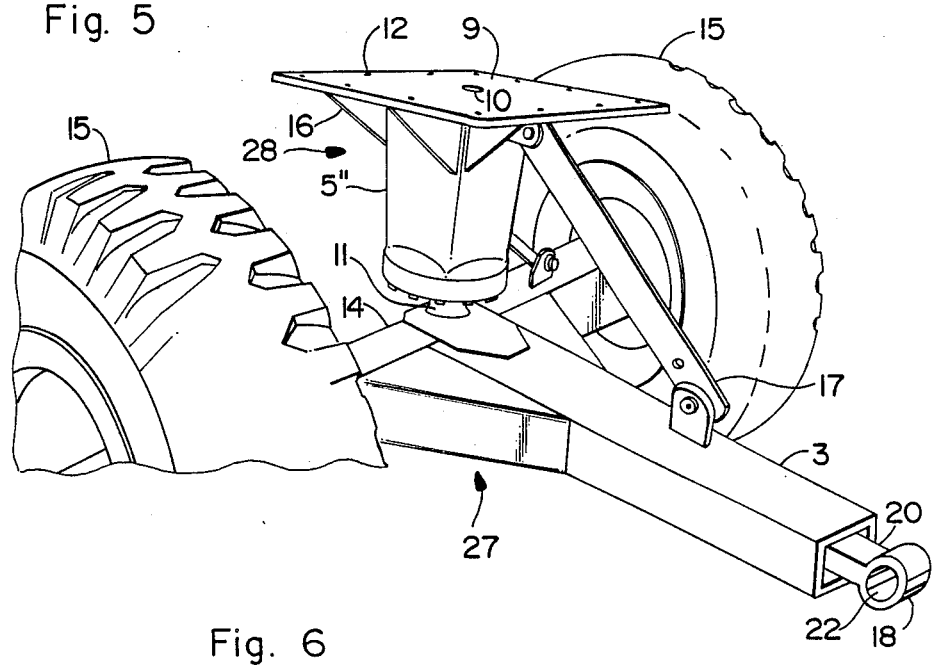
FIG. 5 is another perspective view of a lower portion of the convertible hitch of the present invention.
Figure 6:
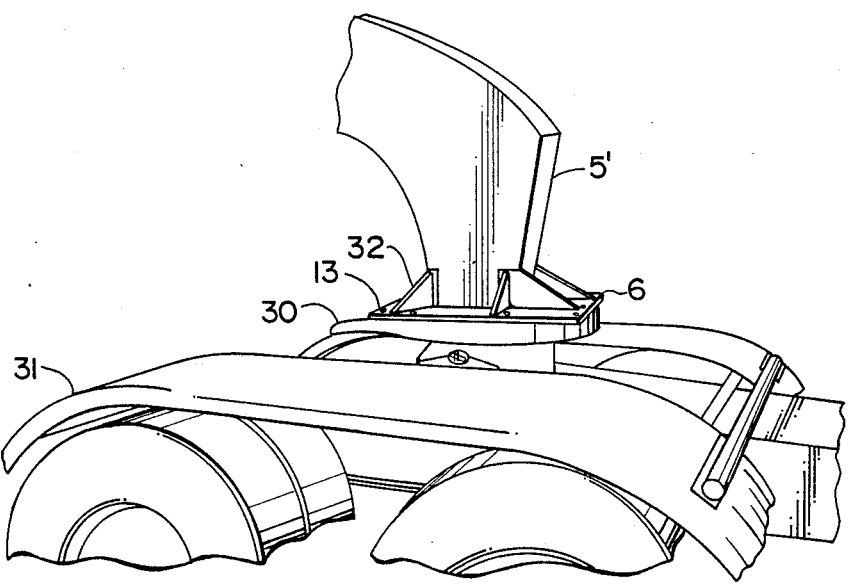
FIG. 6 is a perspective view of an upper portion of the convertible hitch of the present invention, releasably engaged with a conventional, releasable fifth wheel on a highway vehicle.

FIGS. 4 and 5 are additional views of the second plate 9, lower gooseneck 5", ball joint 11 and tow bar member 3 of the present invention. In addition to central aperture 10, second plate 9 preferably includes a plurality of holes 12 around its outer periphery. First plate 6 includes correspondingly located holes 13 (FIG. 6). Correspondingly located holes 12 and 13 of first and second plates 6 and 9 are provided for receipt of bolts and nuts or other fasteners 21 (FIG. 2) for removably fastening first and second plates 6 and 9 to one another. Of course, one of plates 6 and 9 (preferably second plate 9) could be provided with threaded studs pressed into the plurality of holes, which studs could be passed through the plurality of holes in the other plate and secured with nuts to removable fasten plates 6 and 9 to one another. Other conventional means for removably fastening plates 6 and 9 to one another will be apparent to persons skilled in the art from the foregoing discussion.

Tow bar member 3 preferably includes a cross member 14 unto which are mounted wheels 15. Wheels 15 may be mounted by means of spindles and bearings, or in any other conventional manner well known to persons skilled in the art. Ribs 16 are preferably provided between lower gooseneck portion 5" and second plate 9 for reinforcement, and one or more braces 17 (two of which are depicted) are preferably provided to retain second plate 9 and lower gooseneck portion 5" in a generally upright position with respect to tow bar member 3 when removed from first plate 6. At least two braces 17 are preferred, one extending in a longitudinal direction and one extending in an axial direction. Of course, braces 17 must be removed during field use to permit sufficient relative movement between lower gooseneck portion 5" and tow bar member 3 via ball joint 11.

Tow bar member 3 is also provided with a conventional tow bar hitching mechanism 18 for engagement with a conventional tow bar coupling on the field vehicle. Any one of several conventional tow bar hitching mechanisms and couplings may be utilized. In the hitching mechanism of FIGS. 4 and 5, a rod 20 is rotatably fastened to tow bar member 3 by means of a packed grease fitting (not shown). Rod 20 is then engageable between the arms of a conventional tow bar coupling, and is secured thereto by means of a pin (not shown) passing through aperture 22 in rod 20 and apertures in the arms of the tow bar coupling, in a known manner.

If assembled as described above, tow bar member 3, cross member 14 and wheels 15 form a wheel and axle assembly 27 which can be towed in a conventional manner in the field by means of a conventional field vehicle with a conventional tow bar coupling. Second plate 9 and lower gooseneck portion 5" form a substitute fifth wheel assembly 28 to which the mobile equipment can be removably fastened via first plate 6. Ball joint 11 provides for relative movement between the substitute fifth wheel assembly and the wheel and axle assembly, and hence between the mobile equipment and the field vehicle.

FIG. 6 is another view of the upper gooseneck portion 5' and first plate 6 of FIGS. 2 and 3, engaged with a conventional, releasable fifth wheel 30 of a semitrailer truck or other highway vehicle 31. As with second plate 9, ribs 32 preferably provided between first plate 6 and upper gooseneck portion 5" for reinforcement.

Figure 7:
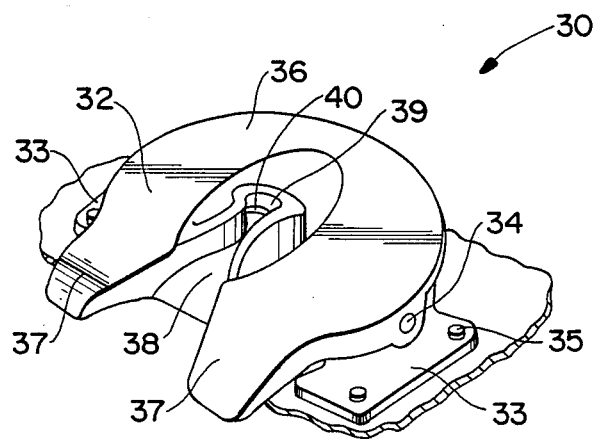
FIG. 7 is a rear perspective view of the conventional, releasable fifth wheel of the highway vehicle of FIG. 6.

The conventional, releasable fifth wheel 30 of highway vehicle 31 is best shown in FIG. 7. As shown, fifth wheel 30 includes a coupling plate 32 pivotally mounted on a pair of spaced apart attachment brackets 33 by means of pivot pins 34, brackets 33 being bolted to the highway vehicle by means of conventional bolts 35 in a well known manner. Coupling plate 32 has an upper bearing surface 36, a pair of laterally spaced apart rearwardly projecting inclined ramps 37, and a rearwardly opening throat 38 terminating forwardly in a downwardly opening recess 39. King pin 7 of first plate 6 is engageable with recess 39 of the conventional, releasable fifth wheel, and is locked in place by a securing mechanism 40 which engages with circumferential groove 8 of king pin 7. King pin 7 is releasable from securing mechanism 40 and recess 39 by means of a conventional release lever (not shown).

Persons skilled in the art will appreciate from the foregoing description that the various elements of the convertible hitch of the present invention, including the plates, gooseneck, ribs, braces, tow bar member and cross member easily may be fabricated from inexpensive, readily available tubular or plate stock by conventional rough-cut methods. The various elements of the convertible hitch need not be subjected to fine machine finishing operations, with the possible exception of basic deburring and grinding steps to remove potentially hazardous burrs and surface roughness. Ball joint 11 is a readily-available shelf item which easily may be installed by welding or otherwise fixing the ball and base portion thereof to tow bar member 3, and by fastening the socket portion thereof to lower gooseneck portion 5" with machine bolts or other conventional fasteners.

Persons skilled in the art will further appreciate from the above disclosure that adaptive modifications readily may be made to the convertible hitch depending upon the specific mobile equipment, field vehicle and highway vehicle with which it is to be utilized. For example, first plate 6 need not be fixed to an upper gooseneck portion 5', but may be fixed to some other portion of the mobile equipment. Likewise, second plate 9 need not be fixed to a lower gooseneck portion 5", but instead may be directly mounted onto tow bar member 3 either rigidly or via bolt joint 11. Similar adaptive modifications will be readily apparent from the above discussion.

The convertible hitch of the present invention is as easy and safe to utilize as it is to manufacture. For transporting the mobile equipment on the highway to a job site, a highway vehicle 31 is backed under first plate 6 as shown in FIG. 6, and releasable fifth wheel 30 is elevated until circumferential groove 8 of king pin 7 lockingly engages with securing mechanism 40. After the mobile equipment is safely delivered to the job site, securing mechanism 40 of fifth wheel 30 is released with the fifth wheel release lever (not shown), fifth wheel 30 is lowered, and highway vehicle 31 is driven out from under first plate 6. To prepare the mobile equipment for field use, wheel and axle assembly 27 is then wheeled adjacent to the mobile equipment, and substitute fifth wheel assembly 28 is maneuvered into place under first plate 6 by tilting manipulations of tow bar member 3 to bring plates 6 and 9 into engagement with king pin 7 engaged within central aperture 10 and holes 12 and 13 aligned. Plates 6 and 9 are then fastened together by means of nuts and bolts or other conventional fasteners as described above, to removably fasten wheel and axle assembly 27 to the mobile equipment. Braces 17 are then removed, and hitching mechanism 18 of tow bar member 3 is then engaged with and secured to the tow bar coupling on a field vehicle in a known manner as described previously. The mobile equipment is then ready for field use, after which the foregoing procedure readily may be reversed to prepare the mobile equipment for highway transportation once again.

In accordance with the above, a convertible hitch is provided which incorporates the safety of highway towing of mobile equipment by means of a releasable fifth wheel on a highway vehicle, while at the same time retaining the simplicity, efficiency and effectiveness of field towing of mobile equipment with a conventional field vehicle by means of a tow bar member and tow bar coupling. Further in accordance with the above, a convertible hitch for mobile equipment is provided which can be manufactured easily and economically, and which can be utilized quickly and easily over an extended period of time and under the roughest terrain conditions with minimal required maintenance.

Obviously, many modifications and variations to the disclosed convertible hitch are possible in light of the above teachings. It is therefore to be understood that, within the scope of the appended claims, the invention may be practiced otherwise than as specifically described. For example, the various aspects of the invention may be selected for combination in a number of permutations other than those shown and described. Thus, while only certain embodiments of the invention have been specifically described herein, it will be apparent that numerous modifications may be made thereto without departing from the spirit and scope of the invention.

What is claimed is:

1. A convertible hitch for mobile equipment, said convertible hitch comprising
    first hitch means for hitching said mobile equipment to a releasable fifth wheel of a highway vehicle, said first hitch means being attached to said mobile equipment and comprising a first plate with a king pin protruding therefrom for engagement with said releasable fifth wheel of said highway vehicle;
    second hitch means removably fastenable to said first hitch means for hitching said mobile equipment to a tow bar coupling of a field vehicle, said second hitch means comprising a tow bar member removable attachable to said tow bar coupling of said field vehicle, and a second plate mounted on said tow bar member and having an aperture for engagement with said king pin of said first plate; and
    fastening means for fastening said first and second plates to one another.

2. The convertible hitch of claim 1, said king pin including a circumferential groove for engagement with a securing mechanism on said releasable fifth wheel of said highway vehicle.

3. The convertible hitch of claim 1, said first plate being attached to a gooseneck of said mobile equipment.

4. The convertible hitch of claim 1, said fastening means comprising correspondingly located holes in said first and second plates for receipt of fasteners for removably fastening said first and second plates to one another.

5. The convertible hitch of claim 1, said first and second plates being flat plates.

6. The convertible hitch of claim 1, further comprising means between said tow bar member and said second plate for providing relative movement therebetween.

7. The convertible hitch of claim 6, at least one brace being provided between said tow bar member and said second plate.

8. The convertible hitch of claim 6, wherein said means between said tow bar member and said second plate for providing relative movement therebetween comprises a ball joint.

9. The convertible hitch of claim 1, said tow bar member having at least one pair of wheels mounted thereon.

10. A convertible hitch for mobile equipment, said convertible hitch comprising:

a first hitch plate attached to said mobile equipment and having a king pin protruding therefrom;

a tow bar member removably attachable to a tow bar coupling of a field vehicle;

a second hitch plate mounted on said tow bar member and having an aperture; for engagement with said king pin of said first hitch plate and a ball joint between said tow bar member and said second hitch plate;

wherein said first hitch plate is engageable with either one of a releasable fifth wheel of a highway vehicle or said second hitch plate, so that said mobile equipment may be towed by either one of said highway vehicle and said field vehicle.

11. The convertible hitch of claim 10, said tow bar member having at least one pair of wheels mounted thereon.

12. The convertible hitch of claim 10, at least one brace being provided between said tow bar member and said second hitch plate.

13. A convertible hitch for mobile equipment, said convertible hitch comprising:

a first hitch plate attached to said mobile equipment and having a king pin protruding an portion thereof;

a tow bar member removably attachable to a tow bar coupling of a field vehicle, said tow bar member having at least one pair of wheels mounted thereon;

a second hitch plate mounted on said tow bar member and having a central an aperture; for engagement with said king pin of said first hitch plate a ball joint between said tow bar member and said second hitch plate; and fastening means for fastening said first and second hitch plates to one another;

wherein said first hitch plate is engageable with either one of a releasable fifth wheel of a highway vehicle and said second hitch plate, so that said mobile equipment may be towed by either one of said highway vehicle and said field vehicle.

14. The convertible hitch of claim 13, said king pin including a circumferential groove for engagement with a securing mechanism on said releasable fifth wheel of said highway vehicle.

15. The convertible hitch of claim 13, said first hitch plate being attached to a goose neck of said mobile equipment.

16. The convertible hitch of claim 13, said fastening means comprising correspondingly located holes in said first and second hitch plates for receipt of fasteners for removably fastening said first and second hitch plates to one another.

17. The convertible hitch of claim 13, said first and second hitch plates being flat plates.

18. The convertible hitch of claim 13, at least one brace being provided between said tow bar member and said second hitch plate.

* * * * *